(12) United States Patent
Nakano et al.

(10) Patent No.: US 8,279,497 B2
(45) Date of Patent: Oct. 2, 2012

(54) IMAGE-READING DEVICE PERFORMING SHADING CORRECTION BASED ON WHITE REFERENCE DATA

(75) Inventors: Keiichi Nakano, Komaki (JP); Takahiro Ikeno, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1053 days.

(21) Appl. No.: 11/790,127

(22) Filed: Apr. 24, 2007

(65) Prior Publication Data

US 2007/0285739 A1 Dec. 13, 2007

(30) Foreign Application Priority Data

May 15, 2006 (JP) ................ P2006-135201

(51) Int. Cl.
*H04N 1/04* (2006.01)
(52) U.S. Cl. ........ 358/474; 358/406; 358/461; 358/486; 358/401; 358/413; 358/451; 358/494; 358/497
(58) Field of Classification Search .......... 358/474, 358/471, 400
See application file for complete search history.

(56) References Cited

U.S. PATENT DOCUMENTS

| 5,206,501 | A | * | 4/1993 | Sakakibara et al. | ........ 250/208.1 |
| 5,400,153 | A | * | 3/1995 | Schonenberg et al. | ....... 358/516 |
| 5,970,181 | A | * | 10/1999 | Ohtsu | ........................... 382/274 |
| 6,323,965 | B1 | | 11/2001 | Kodan | |
| 6,791,721 | B1 | | 9/2004 | Konogaya et al. | |
| 2001/0026325 | A1 | * | 10/2001 | Iida | ................................ 348/362 |
| 2004/0165223 | A1 | * | 8/2004 | Ishido et al. | .................. 358/449 |
| 2005/0029352 | A1 | | 2/2005 | Spears | |
| 2006/0012689 | A1 | | 1/2006 | Dalton et al. | |

FOREIGN PATENT DOCUMENTS

EP 1 233 606 A2 8/2002
(Continued)

OTHER PUBLICATIONS

Ohashi Kazuhito, Image Reader, Image Reading Method and Storage Medium, Apr. 28, 2000, JP 2000122188 A.*
Chinese Office Action, with English Translation, issued in Chinese Patent Application No. 2007101025383 dated on Nov. 21, 2008.

(Continued)

*Primary Examiner* — Benny Q Tieu
*Assistant Examiner* — Martin Mushambo
(74) *Attorney, Agent, or Firm* — Baker Botts L.L.P.

(57) ABSTRACT

An image-reading device includes a document-supporting base, a document-pressing member, a reading unit, a controlling unit, and a determining unit. The document-supporting base has a transparent member on which a document is placed. The document-pressing member is disposed on the document-supporting base so as to cover the transparent member. The document-pressing member is capable of opening and closing on the document-supporting base. The reading unit has a light source and capable of reading an image from the document placed on the transparent member while the light source irradiates light on the document. The controlling unit is configured to control the reading unit to execute a first scanning operation to output image signals for the image on the document while the light source is lit, and a second scanning operation to output image signals for the image on the document while the light source is not lit. The determining unit is configured to determine whether outside light has penetrated the document-supporting base based on the image signals for the second scanning operation outputted from the reading unit.

13 Claims, 10 Drawing Sheets

FOREIGN PATENT DOCUMENTS

| | | |
|---|---|---|
| GB | 2 405 045 A | 2/2005 |
| JP | H08-248529 A | 9/1996 |
| JP | H09-266525 A | 10/1997 |
| JP | H10-154221 A | 6/1998 |
| JP | H11-041463 A | 2/1999 |
| JP | 2001-111795 | 4/2001 |
| JP | 2002-185796 | 6/2002 |
| JP | 2005-065276 A | 3/2005 |
| JP | 2007-028413 A | 2/2007 |

OTHER PUBLICATIONS

European Search Report, issued in European Patent Application No. EP 07 25 1696, mailed Aug. 7, 2007.

Japan Patent Office, Office Action for Japanese Patent Application No. 2006-135201 (counterpart to above-captioned patent application), mailed Feb. 1, 2011.

European Patent Office, Office Action for European Patent Application No. 07251696.6 (counterpart to above-captioned patent application), dated Jun. 14, 2012.

* cited by examiner

IMAGE-READING DEVICE PERFORMING SHADING CORRECTION BASED ON WHITE REFERENCE DATA

CROSS REFERENCE TO RELATED APPLICATIONS

This application claims priority from Japanese Patent Application No. 2006-135201 filed May 15, 2006. The entire content of priority application is incorporated herein by reference.

TECHNICAL FIELD

The present invention relates to an image-reading device provided with a flatbed scanner (FBS).

BACKGROUND

Some image-reading devices well known in the art are configured with a document-supporting base having an opening in the top surface thereof, a platen glass (transparent member) mounted on the top surface of the document-supporting base, and reading unit equipped with a contact image sensor (CIS) or the like disposed beneath the platen glass. In this type of image-reading device, a document is placed on the platen glass with a surface to be scanned facing downward. When a user inputs a prescribed operation indicating a desire to begin scanning the document, a scanning operation is performed in which the CIS optically scans an image on the document and outputs optical signals as image signals (electric signals).

In some cases, the document being scanned may be a book or other thick document that prevents the document-pressing member from being closed completely over the document-supporting base. In some instances, the document-pressing member may be left completely open over the platen glass during the scanning operation, while the user presses down on the cover of the book or other thick document to eliminate shadows formed by the binding or the like. In such cases, outside light may penetrate the document-supporting base during the scanning operation, adding outside light to the light emitted from the light source for scanning the document. The addition of this outside light increases the image signals outputted during the scanning operation, resulting in a whiter output image.

To resolve this problem, Japanese Patent Application Publication No. 2002-185796 discloses a copying machine capable of correcting outputted images that have been affected by outside light. This copying machine is a digital copying machine having a sensor for detecting light intensity. The sensor is disposed on the outside of the platen glass on the top surface of the document-supporting base covered by the document-pressing member. The sensor detects the intensity of outside light proportional to the degree in which the document-pressing member is opened. Based on the intensity level detected by the sensor, the copying machine modifies conditions for processing image data scanned from the document, thereby correcting the outputted images based on the detected light levels.

The copying machine in Japanese Patent Application Publication No. 2002-185796 employs a CCD line sensor that extends beyond the document scanning area and uses the portion extending beyond this area in place of the light intensity detection sensor for detecting outside light. Hence, this copying machine can detect outside light without needing a separate sensor for such detection

SUMMARY

However, the light detecting unit provided in the digital copying machine described above is disposed outside the document scanning area. Hence, the light intensity detection sensor or the CCD line sensor detect the intensity of outside light incident on the surface of the document-supporting base outside the platen glass. Further, the digital copying machine performs the light intensity detection before starting a scanning operation. Hence, the digital copying machine having this construction cannot reliably detect the intensity of outside light that enters the document-supporting base during a scanning operation and that actually affects scanning of the document placed on the platen glass.

Although it is possible to provide a sensor inside the document-supporting base for detecting outside light penetrating the base, it is not possible to detect such outside light in this way using a single sensor since the light may enter any region of the platen glass. Providing sensors in a plurality of locations inside the document-supporting base is feasible, but would increase the cost of the device.

In view of the foregoing, it is an object of the present invention to provide an image-reading device having a flatbed scanner that is capable of reliably detecting outside light that penetrates the document-supporting base during a scanning operation and that can affect the scanning of an image from the document placed on a transparent member, without providing a separate sensor for detecting outside light.

To achieve the above and other objects, one aspect of the invention provides an image-reading device including a document-supporting base, a document-pressing member, a reading unit, a controlling unit, and a determining unit. The document-supporting base has a transparent member on which a document is placed. The document-pressing member is disposed on the document-supporting base so as to cover the transparent member. The document-pressing member is capable of opening and closing on the document-supporting base. The reading unit has a light source and capable of reading an image from the document placed on the transparent member while the light source irradiates light on the document. The controlling unit is configured to control the reading unit to execute a first scanning operation to output image signals for the image on the document while the light source is lit, and a second scanning operation to output image signals for the image on the document while the light source is not lit. The determining unit is configured to determine whether outside light has penetrated the document-supporting base based on the image signals for the second scanning operation outputted from the reading unit.

In another aspect of the invention, there is provided an image-reading method for an image-reading device. The image-reading device includes a document-supporting base having a transparent member on which a document is placed; a document-pressing member disposed on the document-supporting base so as to cover the transparent member, the document-pressing member being capable of opening and closing on the document-supporting base; and a reading unit having a light source. The image-reading method includes:

reading an image from the document placed on the transparent member while the light source irradiates light on the document;

controlling the reading unit to execute a first scanning operation to output image signals for the image on the document while the light source is lit, and a second scanning operation to output image signals for the image on the document while the light source is not lit; and determining whether outside light has penetrated the document-supporting base based on the image signals for the second scanning operation outputted from the reading unit.

DETAILED DESCRIPTION

Next, the present invention will be described in detail based on a preferred embodiment while referring to the accompanying drawings. The preferred embodiment is merely one example of implementing the present invention and may be modified in any way within the defined scope of the invention.

Figure 1:
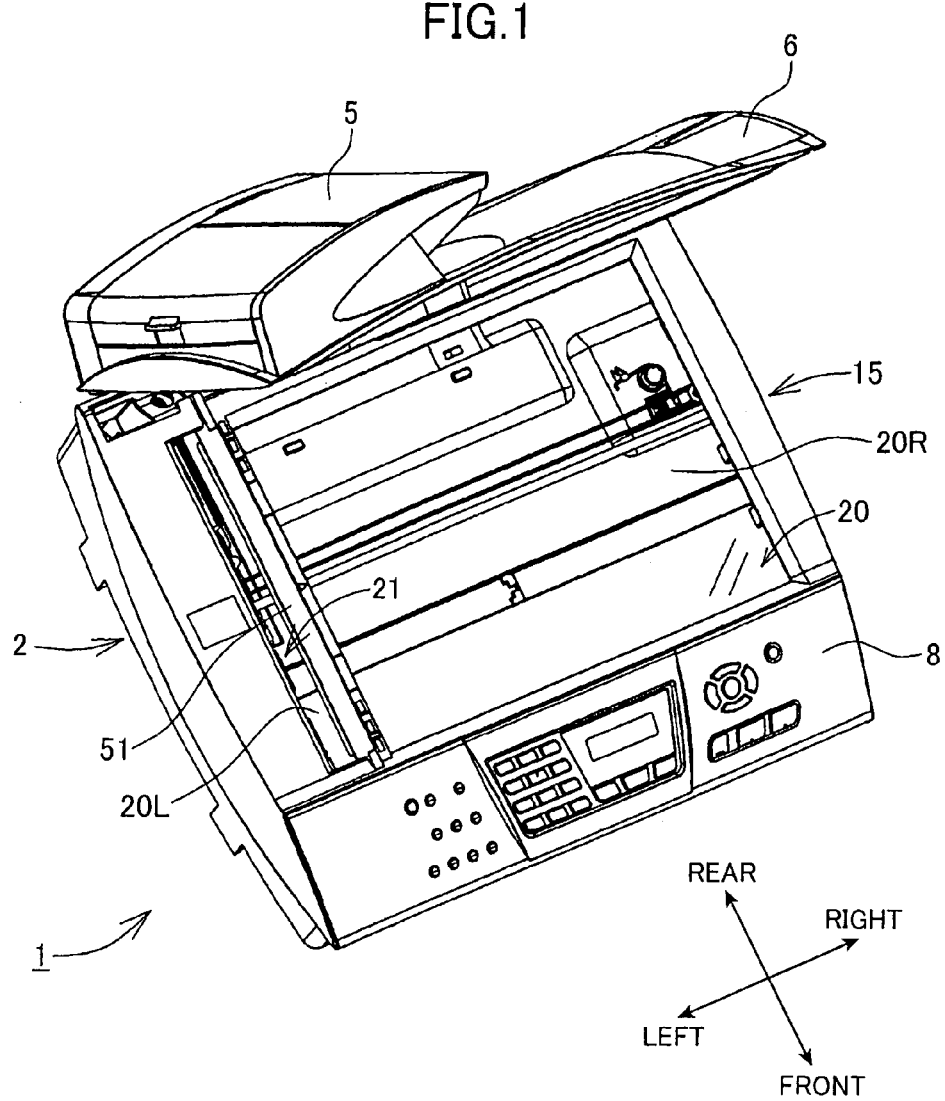
FIG. 1 is a perspective view showing the external structure of an image-reading device according to a preferred embodiment of the present invention.

FIG. 1 is a perspective view showing the outer structure of an image-reading device 1 according to the preferred embodiment. The image-reading device 1 may be employed as a scanning unit in a multifunction device that is integrally provided with printer and scanner functions, or as an image-reading device in a copying machine, for example. In the preferred embodiment, the printer function and the like may be implemented with any mechanism, and the image-reading device 1 may be implemented as a flatbed scanner (FBS) having only a scanner function, for example.

Figure 2:
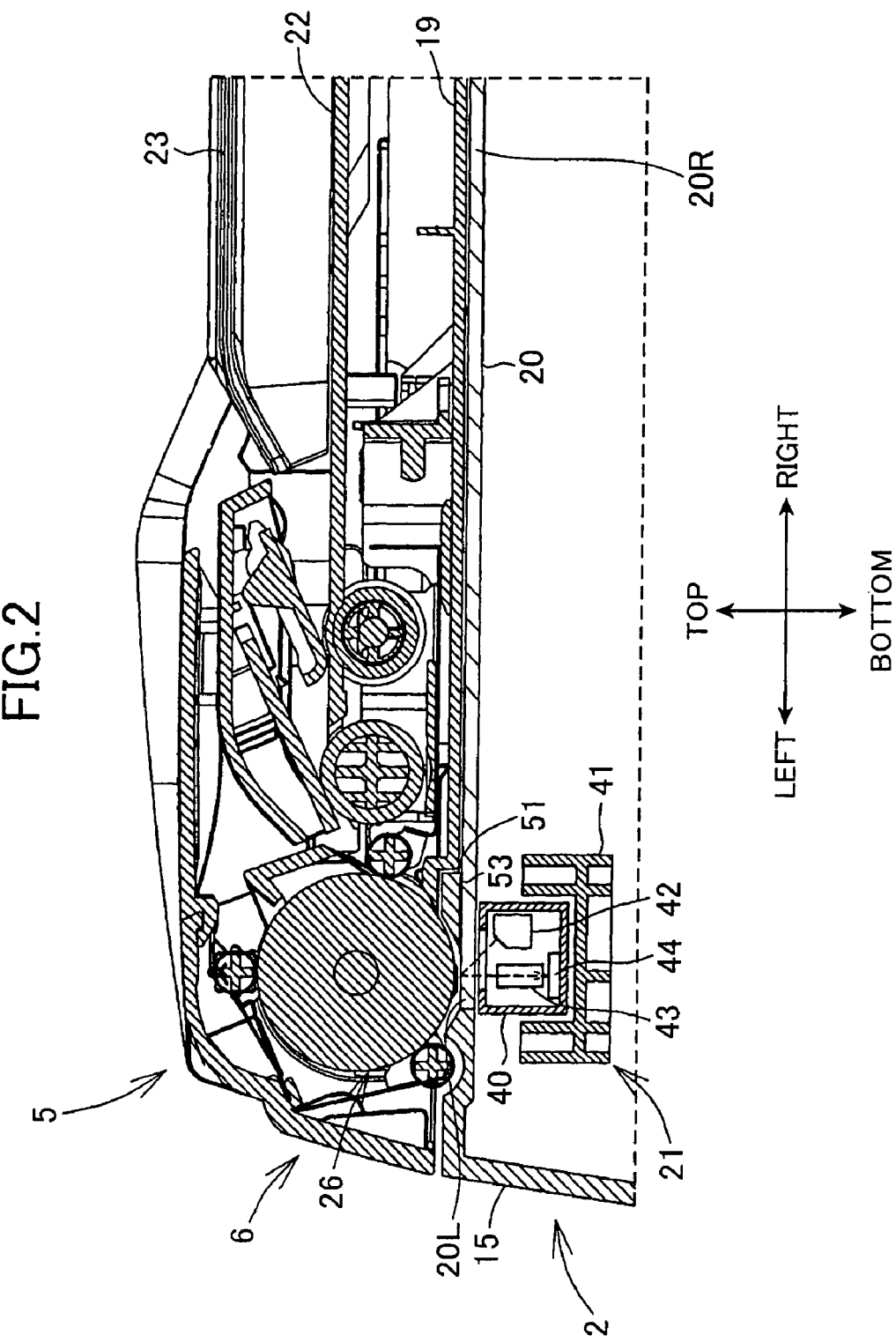
FIG. 2 is a partial cross-sectional view of the image-reading device according to the preferred embodiment.

FIG. 2 is a partial cross-sectional view of the image-reading device 1. As shown in FIGS. 1 and 2, the image-reading device 1 includes a document-supporting base 2 functioning as the flatbed scanner, and a document cover 6 mounted on the document-supporting base 2 by hinges disposed on the rear side, so as to be capable of opening and closing on the document-supporting base 2 about the hinges. The document cover 6 is provided with an automatic document feeder (ADF) 5. The document-supporting base 2 has a platen glass 20 on which a document is placed. The document-supporting base 2 has a casing 15 that is substantially shaped like a rectangular parallelepiped with an opening in the top side. The platen glass 20 is provided in the top of the casing 15 and seals the opening formed therein. The platen glass 20 is formed of a single transparent glass plate, acrylic plate, or the like and is sufficiently larger than the opening in the casing 15. The area of the platen glass 20 positioned in the opening of the casing 15 is referred to as the document scanning region. An image-reading unit 21 is housed inside the casing 15 for reading images from a document.

As shown in FIG. 1, a partitioning member 51 is disposed on the top surface of the platen glass 20. The partitioning member 51 functions to partition the document scanning region of the platen glass 20 exposed on the top surface of the document-supporting base 2. The partitioning member 51 is an elongated plate-shaped member extending in the front-to-rear direction of the document-supporting base 2, that is, the extended direction of the image-reading unit 21. The partitioning member 51 partitions the platen glass 20 into two left and right regions. The left region of the platen glass 20 in FIG. 1 is a scanning surface used for scanning an image with the ADF 5, while the right region of the platen glass 20 in FIG. 1 is a document support surface used when employing the image-reading device 1 as a flatbed scanner. In other words, the partitioning member 51 partitions the document scanning region of the platen glass 20 into a conveyed document scanning region 20L and a static document scanning region 20R, where conveyed document scanning region 20L is the scanning surface for the ADF 5 and the static document scanning region 20R is the document scanning surface for the flatbed scanner. Further, the partitioning member 51 serves as a reference point for positioning a document when the document is placed in the static document scanning region 20R. The document is placed in the static document scanning region 20R with reference to a center position marked on the partitioning member 51. The partitioning member 51 also includes marks indicating a center position and both edge positions of various sizes of documents, such as A4-size and B5-size documents, which marks are used as guidelines for positioning documents on the static document scanning region 20R.

As described above, the document cover 6 is capable of opening and closing over the document-supporting base 2. The document cover 6 covers the platen glass 20 when closed and exposes the top surface of the platen glass 20 when opened. A sheet of a document of A4 size, legal size, or smaller is placed on the platen glass 20 with the surface to be scanned facing downward. In addition to a thin single sheet of a document, a book or similar bound document may be placed on the platen glass 20. After placing the document on the platen glass 20, the document cover 6 is closed to press the document against the platen glass 20, thereby fixing the document on the platen glass 20. In this state, the image-reading unit 21 scans along the platen glass 20 in the width direction (left-to-right direction), scanning the document in a flatbed scan.

The document cover 6 is provided with the ADF 5 (see FIG. 2) for continuously conveying sheets of a document from a paper tray 22 to a discharge tray 23 along a prescribed conveying path 26. When conveyed by the ADF 5, the document passes over the conveyed document scanning region 20L of the platen glass 20, at which time the image-reading unit 21 is positioned below the conveyed document scanning region 20L. As the document passes over the conveyed document scanning region 20L, the image-reading unit 21 positioned below the conveyed document scanning region 20L scans an image from the document. A pressing member 19 configured of a sponge, white plate, and the like is positioned along the bottom surface of the document cover 6 for pressing the document against the platen glass 20. In the preferred embodiment, the ADF 5 may have a well-known configuration and will not be described in detail here.

As shown in FIG. 1, a control panel 8 is provided on the front surface side of the document-supporting base 2. The control panel 8 includes various operating buttons, and a liquid crystal display. The image-reading device 1 is operated based on user instructions inputted via the control panel 8. The user performs an operation to input an instruction for beginning a scanning operation on either a document placed on the platen glass 20 or a document set in the paper tray 22. Alternatively, the image-reading device 1 may be connected to a computer and may perform operations based on instructions transmitted from the computer through a scanner driver or the like.

As shown in FIG. 2, the image-reading unit 21 includes a CIS unit 40, a carriage 41, and a scanning mechanism (not shown). The CIS unit 40 is commonly referred to as a contact image sensor and includes light sources 42 for irradiating light through the platen glass 20 onto the document, lenses 43 for condensing light reflected off the document, and light-receiving elements 44 for receiving and converting the condensed light into electric signals. The light-receiving elements 44 are arranged in units of chips, for example, in a row along a main scanning direction (direction orthogonal to the plane of the drawing in FIG. 2) The light sources 42 and lenses 43 are arranged in the same direction. Further, the light sources 42 employ three-color light-emitting diodes (LEDs) that can be separated into red, green, and blue.

Figure 3:
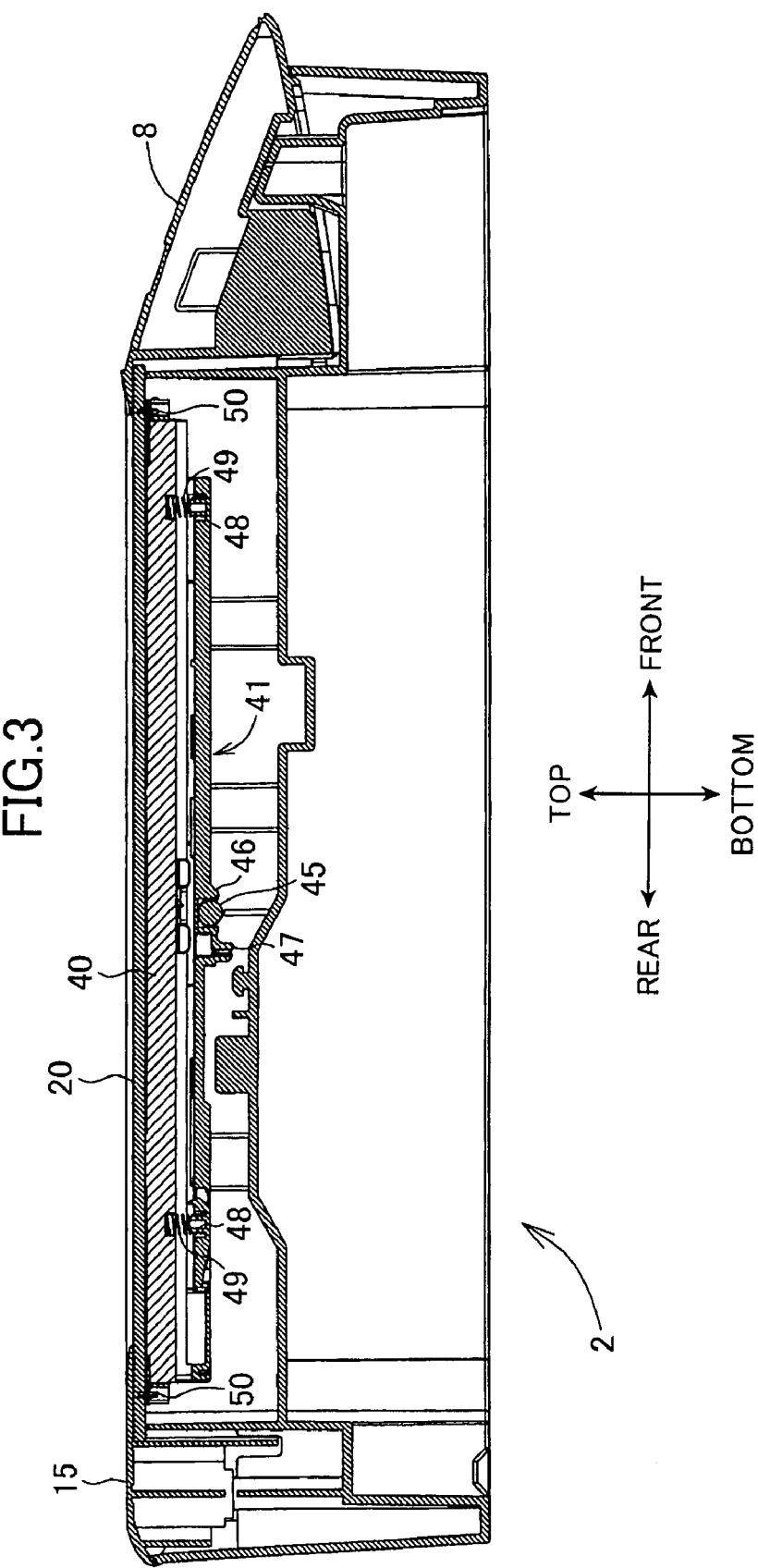
FIG. 3 is a cross-sectional view of a document-supporting base showing the structure of a carriage in FIG. 2.

FIG. 3 is a vertical cross-sectional view of the document-supporting base 2 showing the structure of the carriage 41.

As shown in FIG. 3, the carriage 41 can be reciprocated below the platen glass 20 in the width direction of the casing 15 (direction orthogonal to the plane of the drawing in FIG. 3) by a belt drive mechanism (not shown). The carriage 41 is fitted over a guide shaft 45 spanning the left-to-right direction of the casing 15 and slides over the guide shaft 45 when driven by the belt drive mechanism. The CIS unit 40 is mounted on the carriage 41 in close contact with the platen glass 20. By moving the carriage 41 supporting the CIS unit 40 over the guide shaft 45, the CIS unit 40 can be reciprocated along the platen glass 20.

The carriage 41 supports the CIS unit 40 on the top side thereof. A shaft-receiving part 46 is formed in the bottom surface of the carriage 41 for fitting over the top of the guide shaft 45. When the shaft-receiving part 46 is fitted onto the guide shaft 45, the carriage 41 is supported on the guide shaft 45 while being capable of sliding in the axial direction (front-to-rear direction) of the guide shaft 45. A belt-holding part 47 protrudes downward from the side of the shaft-receiving part 46. The belt-holding part 47 grips a timing belt (not shown) in the belt drive mechanism to couple the timing belt with the carriage 41. Accordingly, the drive force of the belt drive mechanism can be transferred to the carriage 41 in order to move the carriage 41 over the guide shaft 45. The belt drive mechanism may be configured of a drive pulley, follow pulley, and the timing belt looped around the two pulleys. By outputting the rotation of a motor to a shaft of the drive pulley, the drive pulley can be rotated, thereby moving the timing belt around the pulleys.

Coil-receiving parts 48 are formed in the carriage 41 at two front and rear locations. Coil springs 49 positioned by the coil-receiving parts 48 are interposed between the CIS unit 40 and carriage 41. The coil springs 49 apply pressure to the CIS unit 40 to ensure that the CIS unit 40 remains in close contact with the bottom surface of the platen glass 20. Rollers 50 are also provided on both front and rear ends of the CIS unit 40 to ensure that the CIS unit 40 pressed against the bottom surface of the platen glass 20 remains in close contact with this surface while moving smoothly in association with movement of the carriage 41.

When an instruction is received to begin a scanning operation, the light sources 42 irradiate light onto a document resting on the platen glass 20. The light-receiving elements 44 receive light reflected off the document and output image signals for one line worth in the main scanning direction. The entire image on the document is read by repeatedly scanning one line at a time while the carriage 41 moves in the subscanning direction.

Figure 4:
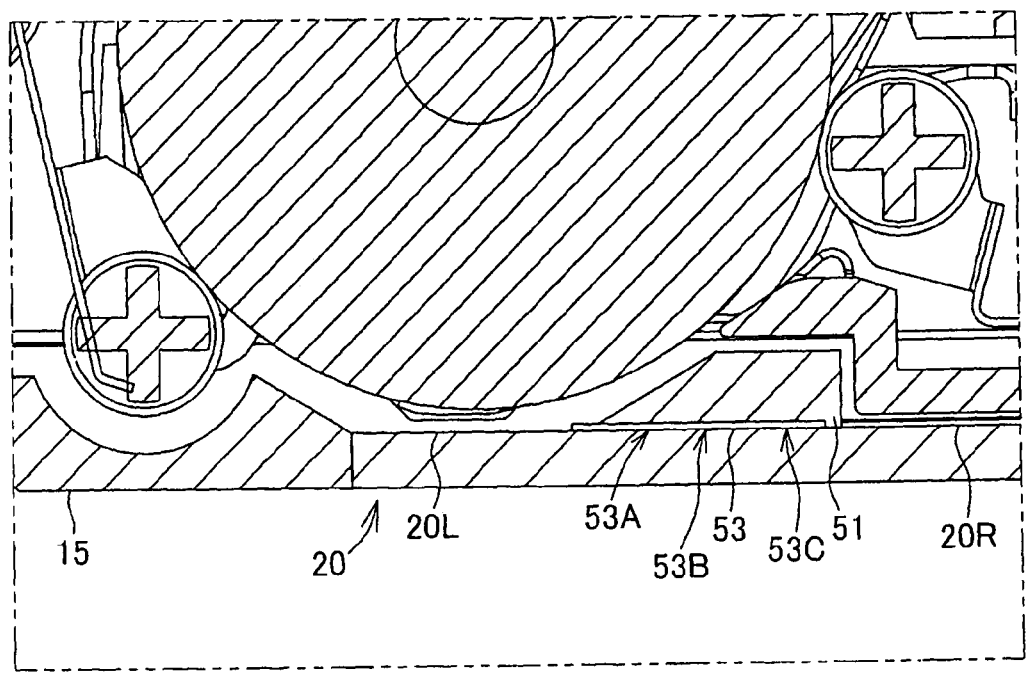
FIG. 4 is an enlarged cross-sectional view showing the structure of document cover near a reference member in FIG. 2.
Figure 5:
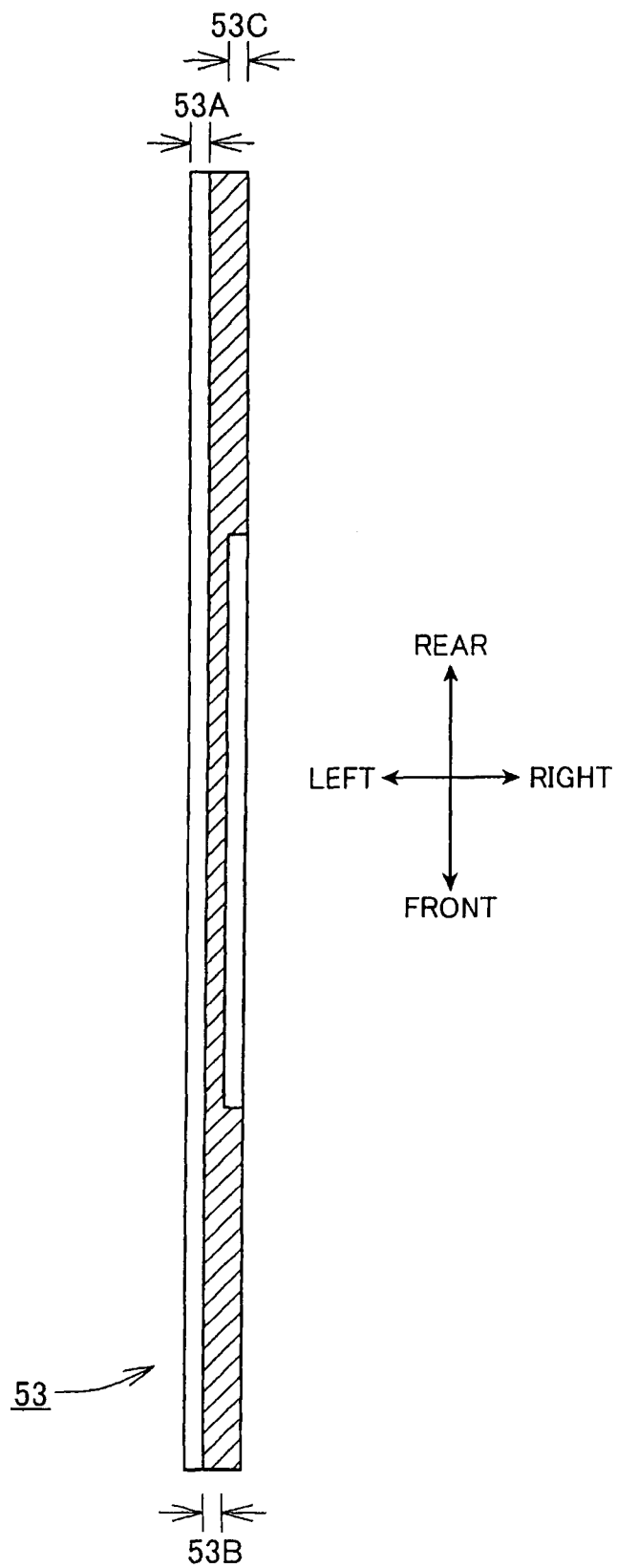
FIG. 5 is a plan view showing the structure of the reference member in FIG. 2.

FIG. 4 is an enlarged cross-sectional view showing the structure of the document cover 6 near a reference member 53. FIG. 5 is a plan view showing the structure of the reference member 53.

As shown in FIG. 4, the reference member 53 is disposed on the bottom surface side of the partitioning member 51 and interposed between the partitioning member 51 and the platen glass 20. The reference member 53 is a lightness reference for the CIS unit 40. Specifically, the reference member 53 is a strip-like film covering almost the entire bottom surface of the partitioning member 51. As shown in FIG. 5, the reference member 53 has three regions juxtaposed in the subscanning direction of the CIS unit 40 (left-to-right direction in FIG. 5). A region 5.3A of the reference member 53 on the left side in FIG. 5 is colored white for calibrating the light intensity of the CIS unit 40 and for acquiring white reference data 30 (see FIG. 6). A center region 53B of the reference member 53 is colored black for obtaining black reference data 32 for the CIS unit 40 (see FIG. 6). The border between the left region 53A and the center region 53B also serves as a reference in the subscanning direction of the CIS unit 40. A right region 53C of the reference member 53 is colored white in a front-to-rear center area and black on both ends thereof and serves as a reference in the main scanning direction of the CIS unit 40. With this construction, the reference member 53 is interposed between the partitioning member 51 and the platen glass 20 so that each region of the reference member 53 extends in the same direction as the CIS unit 40.

Figure 6:
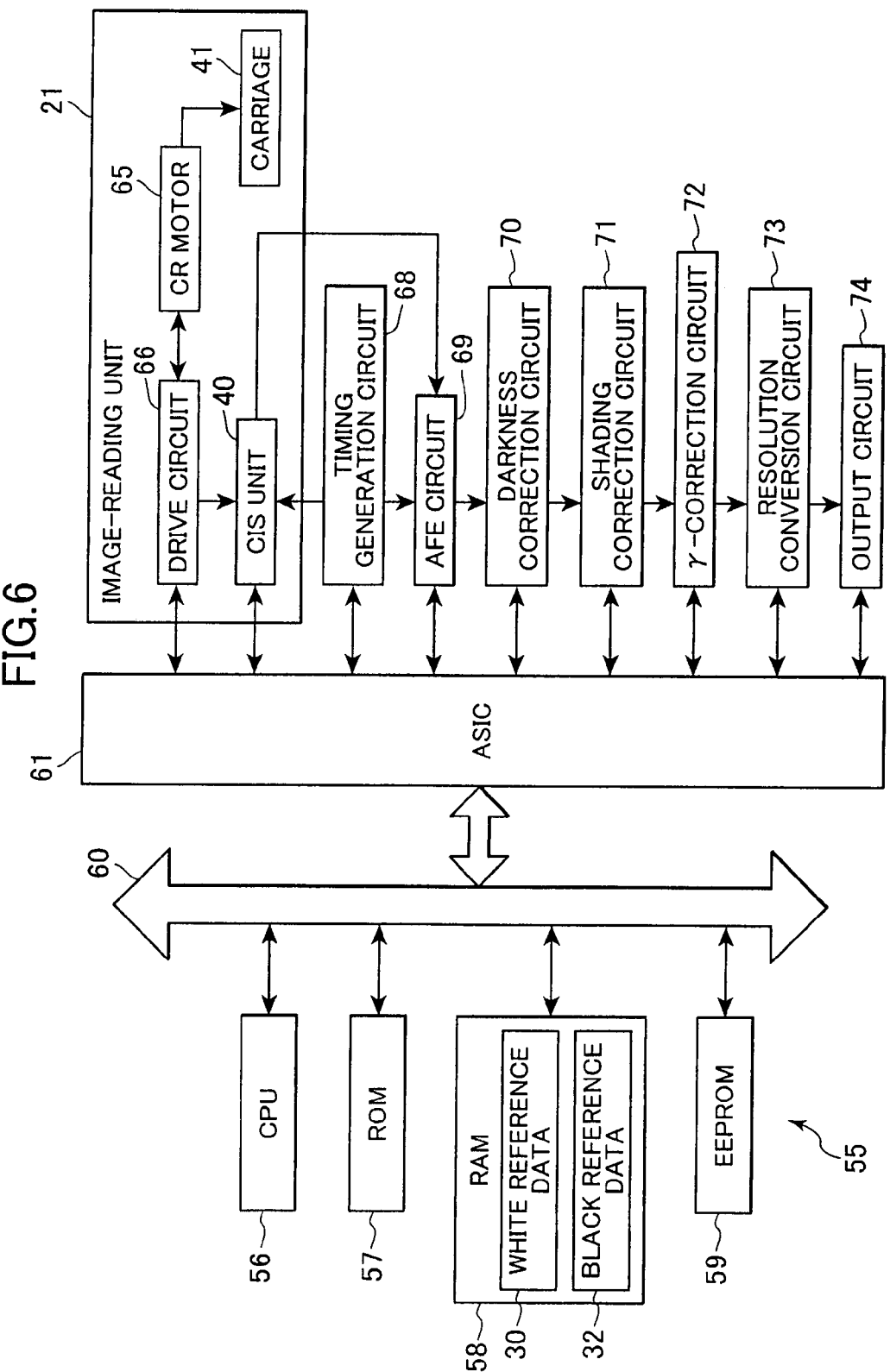
FIG. 6 is a block diagram showing the image-reading device according to the preferred embodiment of the present invention.

FIG. 6 is a block diagram showing the structure of a controller 55 used in the image-reading device 1.

The controller 55 controls the overall operations of the image-reading device 1. As shown in FIG. 6, the controller 55 is configured of a microcomputer including primarily a central processing unit (CPU) 56, a read-only memory (ROM) 57, a random access memory (RAM) 58, an electrically erasable and programmable ROM (EEPROM) 59, all of which are connected to an application specific integrate circuit (ASIC) 61 via a bus 60.

The ROM 57 stores control programs and the like for controlling the various operations of the image-reading device 1. The RAM 58 is used as a storage area or work area for temporarily storing various data used when the CPU 56 executes the control programs. For example, the RAM 58 stores light intensity calibration values for the light sources 42 of the CIS unit 40, and the white reference data 30 and black reference data 32 acquired based on the reference member 53. The EEPROM 59 is a storage area that stores various settings, flags, and the like that must be preserved when the power is switched off, and an outside light detection level (prescribed signal level). In the preferred embodiment, the outside light detection level is a threshold value used in a process for determining whether outside light has penetrated the document-supporting base 2. As will be described later, it is determined that outside light has penetrated the document-supporting base 2 if the signal intensity of an image signal outputted by the CIS unit 40 exceeds the outside light detection level when the light sources 42 are off.

The ASIC 61 controls the image-reading unit 21, a timing generation circuit 68, an analog front end (AFE) circuit 69, a darkness correction circuit 70, a shading correction circuit 71, a γ-correction circuit 72, a resolution conversion circuit 73, and an output circuit 74 based on commands from the CPU 56.

When executing a document scanning operation, the image-reading unit 21 outputs the image read from the document as image signals. In this operation, the image-reading unit 21 irradiates light from the light sources 42 onto the document placed in the static document scanning region 20R of the platen glass 20 and reads the document image one line at a time. The CIS unit 40 of the image-reading unit 21 outputs the scanned document image to the AFE circuit 69 as image signals. The image signals outputted from the image-reading unit 21 include signals constituting image data of the scanned document and signals not constituting image data. As will be described later, image signals that the image-reading unit 21 acquires in a first scanning operation constitute image data for the document, while image signals obtained through a second scanning operation do not constitute image data of the document. The image signals obtained in the second scanning operation are used in a process for determining whether outside light has penetrated the document-supporting base 2.

The controller 55 controls the scanning operation of the image-reading unit 21. Specifically, the controller 55 controls the image-reading unit 21 to execute the first and second scanning operations. The first scanning operation is performed to output the document image as image signals when the light sources 42 are lit. The second scanning operation is performed to output the document image as image signals when the light sources 42 are not lit. Image signals obtained in the first scanning operation are first processed with the circuits 69-73 and subsequently outputted from the output circuit 74 and stored in the RAM 58 as image data. If the image-reading device 1 is used as an image-scanning unit of a copying machine, for example, the image-reading device 1 executes a printing process based on the image data stored in the RAM 58. Image signals acquired in the second scanning operation are first processed by the circuits 69-73 and subsequently outputted from the output circuit 74 to be stored in the RAM 58 as determination data for determining whether outside light has penetrated the document-supporting base 2. The controller 55 determines whether outside light has penetrated the document-supporting base 2 based on the image signals acquired in the second scanning operation that are stored in the RAM 58.

The image-reading unit 21 includes the CIS unit 40 and carriage 41 described earlier, as well as a carriage (CR) motor 65 and a drive circuit 66. The ASIC 61 generates a phase excitation signal and the like for supplying electricity to the carriage motor 65 based on commands from the CPU 56 and provides these signals to the drive circuit 66. The rotation of the carriage motor 65 is controlled by a drive signal supplied to the carriage motor 65 via the drive circuit 66. The drive circuit 66 functions to drive the carriage motor 65 of the belt drive mechanism connected to the carriage 41 and forms electric signals for rotating the carriage motor 65 upon receiving an output signal from the ASIC 61. When the electric signal is received, the carriage motor 65 rotates, and the carriage 41 reciprocates according to the rotational force of the carriage motor 65 transferred to the carriage 41 via the belt drive mechanism. The drive circuit 66 also calibrates an operating current for turning on the light sources 42 in the CIS unit 40 and calibrates the lighting time for each of the RGB colors in the light sources 42. While the carriage 41 reciprocates, the controller 55 controls the CIS unit 40 via the ASIC 61 so that the image-reading unit 21 executes a scanning operation configured of the first and second scanning operations. In addition to the scanning operations, the controller 55 controls the image-reading unit 21 based on a control program stored in the ROM 57 to acquire light intensity calibration values, and the white reference data 30 and black reference data 32 described later.

The timing generation circuit 68 supplies a trigger signal TG and a clock signal to the CIS unit 40 and supplies control signals to the AFE circuit 69. Here, the trigger signal sets the period for a scanning operation for one line by triggering the start of an operation to drive the CIS unit 40. The clock signal sets the timing at which the CIS unit 40 outputs an image signal for one pixel so that an image signal for each pixel is outputted from the CIS unit 40 in synchronization with the clock signal. The CIS unit 40 executes the first and second scanning operations based on the trigger signal and clock signal inputted from the timing generation circuit 68 and an operating current and the like supplied from the drive circuit 66. The AFE circuit 69 samples each analog image signal outputted from the CIS unit 40 and converts the analog image signal to a digital signal. Specifically, the AFE circuit 69 converts the analog image signals outputted from the CIS unit 40 to a digital signal formed of a digital code with a prescribed number of bits. The AFE circuit 69 performs this digital conversion with an analog/digital converter. For example, when an analog image signal is inputted into the AFE circuit 69, the AFE circuit 69 outputs an 8-bit (256 grayscale levels: 0-255) digital image signal to the darkness correction circuit 70.

The darkness correction circuit 70 corrects the image signal inputted from the AFE circuit 69 based on the black reference data 32 stored in the RAM 58 in order to correct variations among light-receiving elements 44. The shading correction circuit 71 corrects the shading of image signals outputted from the image-reading unit 21 (in this case, image signals outputted from the darkness correction circuit 70) in order to correct variations among the light-receiving elements 44 and light sources 42. The shading correction circuit 71 performs this shading correction based on the white reference data 30 stored in the RAM 58. The γ-correction circuit 72 corrects the gamma curve. The resolution conversion circuit 73 corrects resolution. The output circuit 74 outputs image signals calibrated by the circuits 69-73 to be stored in the RAM 58. Since the darkness correction circuit 70, shading correction circuit 71, γ-correction circuit 72, resolution conversion circuit 73, and output circuit 74 are well known in the art, a detailed description of these components is not given here.

Figure 7:
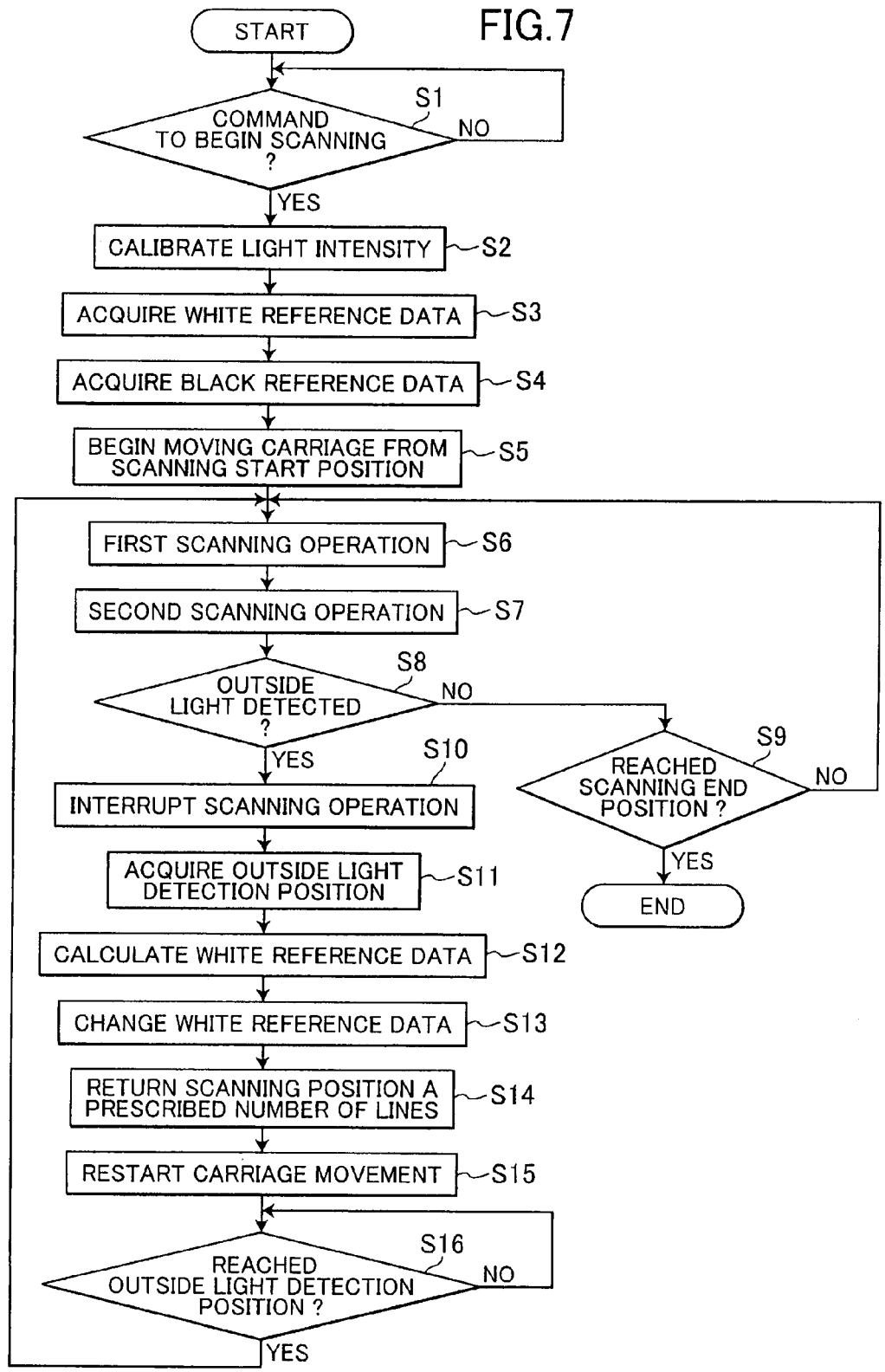
FIG. 7 is a flowchart illustrating steps in a process executed by the image-reading device of the preferred embodiment when a command has been inputted to begin scanning a document placed on a platen glass.

FIG. 7 is a flowchart illustrating steps in a process performed on the image-reading device 1 when the user inputs a command to start scanning a document placed on the platen glass 20.

The following process described with reference to FIG. 7 is performed on the image-reading device 1 when the user inputs a start scanning command after placing a document on the platen glass 20. Specifically, this process is performed based on commands issued by the controller 55 (CPU 56) according to a control program stored in the ROM 57.

When scanning a document with the flatbed scanner, the user opens the document cover 6 and places the document in the static document scanning region 20R of the platen glass 20. Next, the user closes the document cover 6 to fix the document in place on the platen glass 20. The document placed on the platen glass 20 may be a single thin sheet or a thick document, such as a book. In the latter case, a command to scan the document may be inputted while the document cover 6 is not completely closed. The process shown in the flowchart of FIG. 7 is executed regardless of the open and closed state of the document cover 6.

In S1 of the process in FIG. 7, the controller 55 determines whether a command to begin scanning the document has been inputted based on whether a prescribed operation has been performed on the control panel 8. If a scanning command has not been inputted (S1: NO), then the controller 55 remains in a standby state. However, when a scanning command has been inputted (S1: YES), then in S2 the controller 55 calibrates the light intensity of the light sources 42 in the CIS unit 40 based on the reference member 53. More specifically, the controller 55 moves the carriage 41 to a position opposing the left region 53A of the reference member 53 (see FIGS. 4 and 5). Initially, the light sources 42 irradiate light of sufficiently low intensity onto the left region 53A of the reference member 53. At this time, the light reflected off the left region 53A is also low in intensity, resulting in low output from the light-receiving elements 44 of the CIS unit 40. Subsequently, the controller 55 increases the light intensity of the light sources 42 by steps until output from the light-receiving elements 44 reaches a prescribed level. The light intensity when the output from the CIS unit 40 reaches the prescribed level is stored in the RAM 58 as the light intensity calibration value.

In S3 the controller 55 acquires the white reference data 30 for the CIS unit 40 using the reference member 53. More specifically, the controller 55 moves the carriage 41 to a position opposing the left region 53A of the reference member 53, and the light sources 42 of the CIS unit 40 irradiate light onto the left region 53A at the light intensity calibration value found above. The light-receiving elements 44 converts the light reflected off the left region 53A to electric signals to acquire the white reference data 30. The controller 55 stores the white reference data 30 in the RAM 58. Here, it is possible to acquire the white reference data 30 a plurality of times based on the left region 53A and to use the average of this acquired data. The white reference data 30 may also be acquired while moving the carriage 41 within the range of the left region 53A.

In S4 the controller 55 acquires the black reference data 32 for the CIS unit 40 using the reference member 53. More specifically, the controller 55 drives the carriage motor 65 to move the carriage 41 to a position opposing the center region 53B of the reference member 53. Next, the black reference data 32 is acquired from electric signals outputted from the light-receiving elements 44 while the light sources 42 are off. The controller 55 stores this black reference data 32 in the RAM 58. As with the white reference data 30 described above, the black reference data 32 may be acquired a plurality of times and the carriage 41 may be moved within the range of the center region 53B while the black reference data 32 is acquired. The order for acquiring the white reference data 30 and black reference data 32 may also be reversed. The white reference data 30 and black reference data 32 acquired above are used as reference data for shading correction when scanning an image.

After completing the processes in S2-S4, the controller 55 drives the carriage motor 65 to move the carriage 41 to a scanning start position. In the scanning start position, the carriage 41 is in position for beginning the scanning operation of the document placed in the static document scanning region 20R of the platen glass 20. In S5 the controller 55 drives the carriage motor 65 to begin moving the carriage 41. While the carriage 41 is moving, the image-reading unit 21 executes the first and second scanning operations described below. In the scanning operation performed by the image-reading unit 21, the CIS unit 40 reads image data from the document one line at a time.

In S6 the controller 55 controls the image-reading unit 21 to execute the first scanning operation while the carriage 41 is moving. In the first scanning operation, the image-reading unit 21 scans an image from the document placed in the static document scanning region 20R of the platen glass 20 one line at a time while the light sources 42 are on. In the first scanning operation of the preferred embodiment, the light sources 42 irradiate light sequentially in the three colors red, green, and blue, and the CIS unit 40 outputs the document image for each color as one line of image signals. By executing the first scanning operation, the CIS unit 40 outputs one line worth of analog image signals for each of the color components red, green, and blue to the AFE circuit 69.

After the first scanning operation has been executed, in S7 the controller 55 controls the image-reading unit 21 to execute the second scanning operation. In the second scanning operation, the image-reading unit 21 scans the document one line at a time, while the light sources 42 are off. Through this operation, the CIS unit 40 outputs analog image signals for one line worth to the AFE circuit 69. In the preferred embodiment, the second scanning operation is performed after the first scanning operation, but the order of the operations may be reversed.

Figure 8:
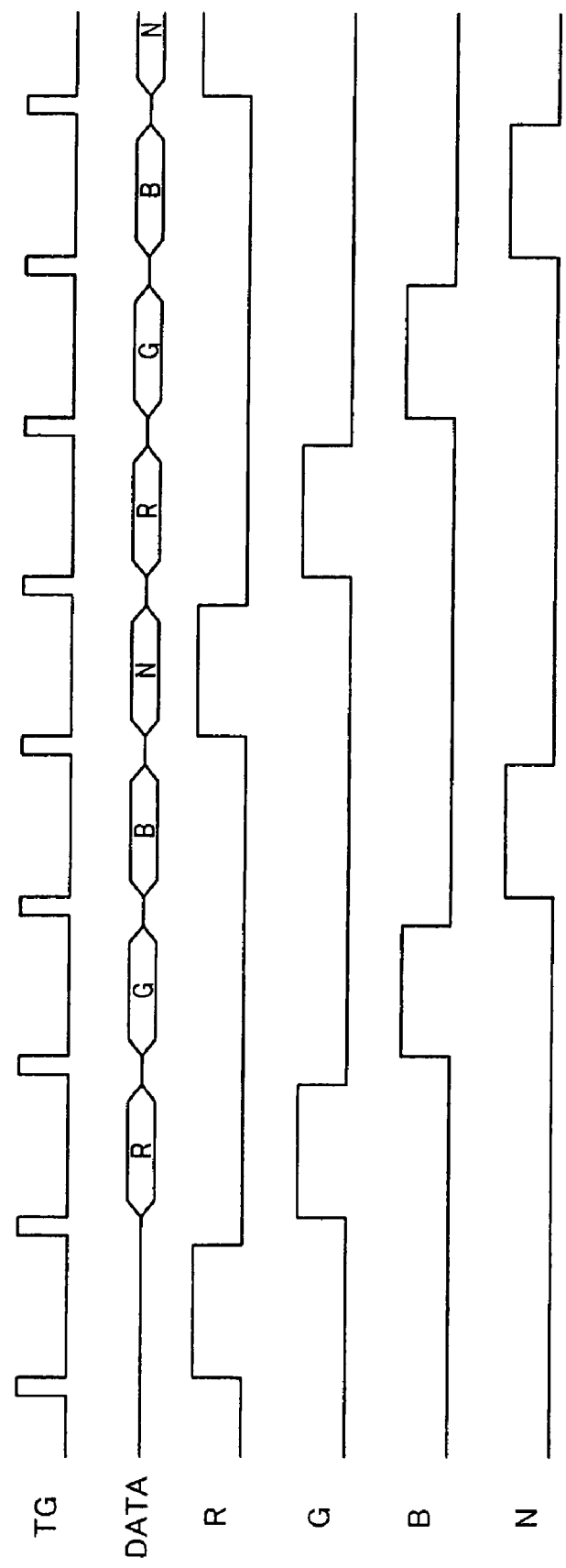
FIG. 8 is a timing chart illustrating an operation for scanning a document executed by an image-reading unit of the image-reading device according to the preferred embodiment.

FIG. 8 is a timing chart showing the flow of the scanning operation executed by the image-reading unit 21. Timings are illustrated for the trigger signal TG that the timing generation circuit 68 inputs into the CIS unit 40, image data outputted from the CIS unit 40 (Data), and the scanning of image data in each color component. In FIG. 8, R represents the timing at which one line worth of an image is read while the light sources 42 are lit in red; G the timing at which one line of image data is read while the light sources 42 are lit in green; B the timing at which one line of image data is read while the light sources 42 are lit in blue; and N the timing at which one line of image data is read while the light sources 42 are off.

As shown in FIG. 8, the timing generation circuit 68 inputs the trigger signal TG into the CIS unit 40 as a control signal to begin scanning one line, at which time the drive circuit 66 lights the red light sources 42 and scans one line. The CIS unit 40 outputs an analog image signal for the red component in one line worth as image data to the AFE circuit 69. The analog image signals for the red component in the line are outputted for each pixel in synchronization with a clock signal (not shown) inputted from the timing generation circuit 68. When the timing generation circuit 68 inputs the next trigger signal TG into the CIS unit 40, the drive circuit 66 turns on the green light sources 42 to scan one line at the rising point of the trigger signal TG. As a result, the CIS unit 40 outputs to the AFE circuit 69 an analog image signal for the green component in one line worth as image data. At the rising point of the next trigger signal TG, the drive circuit 66 turns on the blue light sources 42 to scan an image for one line, and the CIS unit 40 outputs to the AFE circuit 69 analog image signals for the blue component of the line as image data. Hence, in the first scanning operation, the light sources 42 irradiate light of three colors sequentially on the document, and the CIS unit 40 outputs one line worth of image signals for each color.

The next time the trigger signal TG rises after completing the first scanning operation, the drive circuit 66 does not turn on the light sources 42. In this state, the CIS unit 40 scans the image for one line as the second scanning operation and outputs to the AFE circuit 69 one line worth of image signals for detecting outside light.

Although not shown in the drawings, when the trigger signal TG is inputted into the CIS unit 40, image signals for one line worth outputted from the light-receiving elements 44 pass through a transfer gate and are temporarily stored in an analog shift register. When the next trigger signal TG is inputted into the CIS unit 40, the charges (image signal) of the light-receiving elements 44 are reset, and the CIS unit 40 outputs image signals one pixel at a time each time the timing generation circuit 68 inputs a clock signal into the CIS unit 40. Accordingly, as shown in FIG. 8, image signals for each color (Data) are outputted from the CIS unit 40 with a slight delay after the light sources 42 of each color is turned on.

The AFE circuit 69 samples analog image signals obtained in the first and second scanning operations and converts the analog signals to digital signals. The darkness correction circuit 70 subsequently corrects the digital signals based on the black reference data 32 stored in the RAM 58, after which the shading correction circuit 71 corrects the shading of the image signals based on the white reference data 30 stored in the RAM 58. The resulting image signals are corrected by the γ-correction circuit 72 and resolution conversion circuit 73 and subsequently outputted from the output circuit 74 and stored in the RAM 58. Image signals from the first scanning operation that are outputted from the output circuit 74 are stored in the RAM 58 as image data of the document. Image signals from the second scanning operation that are outputted from the output circuit 74 are stored in the RAM 58 as determination data used to determine whether outside light has penetrated the document-supporting base 2.

In S8 the ADF 5 determines whether outside light has penetrated the document-supporting base 2 based on the image signals obtained in the second scanning operation. The controller 55 makes this determination based on whether the signal intensity of the image signals stored in the RAM 58 from the second scanning operation exceeds the outside light detection level stored in the EEPROM 59.

Since the light sources 42 are not turned on during the second scanning operation, the intensity of image signals obtained during the second scanning operation are identical to the black reference data 32 stored in the RAM 58 if outside light has not penetrated the document-supporting base 2. However, if outside light has penetrated the document-supporting base 2, the intensity of image signals obtained in the second scanning operation corresponds to the intensity of the penetrating light. The outside light detection level stored in the EEPROM 59 is set based on the white reference data 30 after the white reference data 30 has been acquired. This detection level is represented by 8 bits of data (256 gray-scale levels: 0-255) and is set to achieve a gray-scale value 25% the level of the white reference data 30. For example, if the gray-scale level of the white reference data 30 is "240," then the outside light detection level is set to a value for achieving a gray-scale level of "60." Image signals obtained in the second scanning operation are 8-bit data, as described above. Hence, the controller 55 determines whether the image signals for one line worth obtained in the second scanning operation exceed the gray-scale value of "60" for each pixel.

Figure 9:
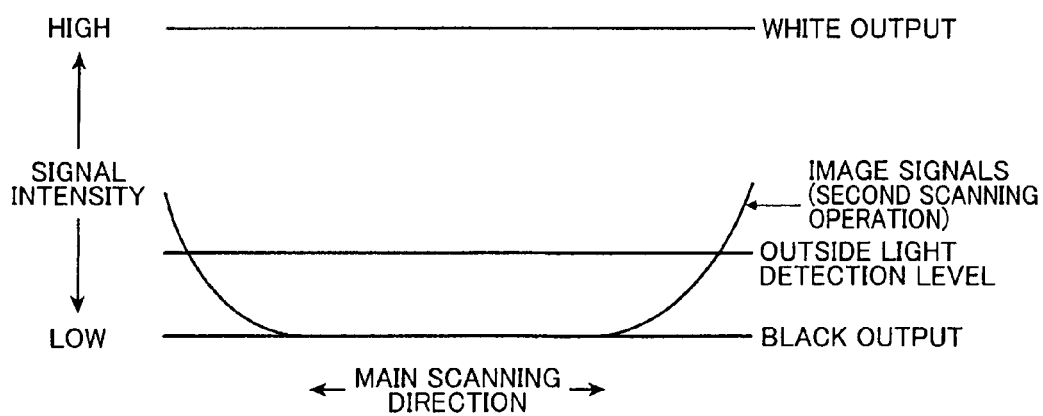
FIG. 9 is a graph illustrating a process for determining whether outside light has penetrated the image-reading device.

FIG. 9 is a graph illustrating a process for determining whether outside light has penetrated the document-supporting base 2.

The curve shown in the graph of FIG. 9 depicts the image signal acquired in S7 during the second scanning operation and stored in the RAM 58. In the graph, "white output" indicates one line worth of image signals obtained by irradiating light from the light sources 42 of the CIS unit 40 onto the left region 53A at the light intensity calibration value and subsequently performing shading correction on the acquired image signals. The "black output" indicates one line worth of image signals obtained when the carriage 41 is positioned across from the center region 53B and the light sources 42 are off, after performing the shading correction. As described above, the outside light detection level has been set to obtain a gray-scale value of 25% relative to the white reference data 30. In the example shown in FIG. 9, the image signals obtained in the second scanning operation for one line in the main scanning direction have a gray-scale value exceeding the outside light detection level near both ends in the main scanning direction. The controller 55 determines whether outside light has penetrated the document-supporting base 2 by determining for each pixel whether the gray-scale value corresponding to the signal intensity of image signals obtained in the second scanning operation has exceeded the outside light detection level. For example, the controller 55 may determine that outside light has penetrated the document.-supporting base 2 if the gray-scale value exceeds the outside light detection level for 50 pixels among the line of image signals acquired in the second scanning operation. If the number of pixels exceeding the outside light detection level is less than 50 pixels, then the controller 55 determines that outside light has not penetrated the document-supporting base 2. In this way, the controller 55 determines that outside light has penetrated the document-supporting base 2 based on whether the signal intensity of image signals outputted from the CIS unit 40 of the image-reading unit 21 during the second scanning operation exceeds the outside light detection level.

If the controller 55 determines in S8 that light has not penetrated the document-supporting base 2 (S8: NO), then in S9 the controller 55 determines whether the scanning position for the document has reached an end position. For example, the controller 55 may count the number of drive pulses applied to the carriage motor 65 after the guide shaft 45 begins moving. The controller 55 determines whether the carriage 41 has reached a scanning end position based on whether the number of counted drive pulses applied to the carriage motor 65 has reached a number by which the carriage 41 would arrive at the scanning end position. If the controller 55 determines that the carriage 41 has not yet reached the end position (S9: NO), then the scanning operation is not yet completed and the controller 55 returns to S6. In this way, the controller 55 controls the image-reading unit 21 to alternately execute the first and second scanning operations. Hence, the second scanning operation is executed in each interval between the repeatedly executed first scanning operation. When the controller 55 determines that the scanning position on the document is the scanning end position, the scanning process is complete and the controller 55 ends the process.

When the controller 55 determines in S8 that outside light has penetrated the document-supporting base 2 (S8: YES), then in S10 the controller 55 interrupts the scanning operation executed by the image-reading unit 21. Specifically, the controller 55 halts movement of the carriage 41 and interrupts the first and second scanning operations performed with the CIS unit 40.

In S11 the controller 55 acquires data for the outside light detection position (scan line) at which outside light was detected. More specifically, the controller 55 acquires outside light detection position data based on position data for image signals assigned to image signals in the second scanning operation when the controller 55 determines that outside light has penetrated the document-supporting base 2.

In S12 the controller 55 calculates the white reference data. More specifically, the controller 55 calculates white reference data based on Equation 1 below using the one line worth of image signals obtained in the second scanning operation when the controller 55 determined that outside light had penetrated the document-supporting base 2.

$$W = W_0 \times \alpha \times V_n / B \qquad \text{Equation 1}$$

In this equation, W on the left side is the calculated white reference data; $W_0$ is the white reference data 30 stored in the RAM 58; $\alpha$ is a correction coefficient, such as 1, 0.5, or 1.5; B is the black reference data 32 stored in the RAM 58; and $V_n$ is an 8-bit number for the signal intensity of the image signal obtained during the second scanning operation when outside light was actually determined to have penetrated the document-supporting base 2. The image signal obtained during the second scanning operation and the white reference data 30 are image signals for one line worth in the main scanning direction. The process for calculating the white reference data based on Equation 1 is performed for each pixel in the line.

In S13 the controller 55 changes the white reference data 30 stored in the RAM 58. Specifically, the controller 55 sets the white reference data for shading calibration of image signals obtained in the first scanning operation executed after the controller 55 determines that outside light has penetrated the document-supporting base 2 to the white reference data calculated in S12.

Figure 10:
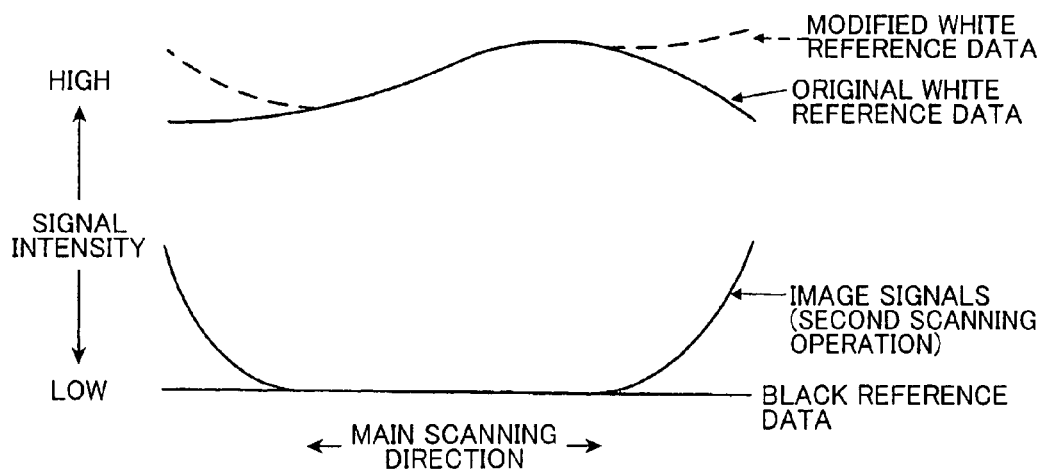
FIG. 10 is a graph illustrating a process for modifying white reference data for the image-reading device.

FIG. 10 is a graph illustrating the process for changing the white reference data 30.

In FIG. 10, the image signal obtained during the second scanning operation with the image-reading unit 21 has a tendency to increase in intensity at both ends in the main scanning direction, indicating that the intensity of outside light increases toward both ends in the main scanning direction. Therefore, the controller 55 performs the process of calculating Equation 1 described above for the white reference data 30 (indicated by a solid line in FIG. 10) already stored in memory to obtain a modified white reference data 30 with increased output values at both ends in the main scanning direction (indicated by a dotted line in FIG. 10).

In the preferred embodiment, the image signal obtained in the second scanning operation is used in the process for determining whether outside light has penetrated the document-supporting base 2 after corrections have been performed with the circuits 69-73. Accordingly, the first scanning operation continues until the controller 55 determines that outside light has penetrated the document-supporting base 2 based on an image signal obtained in the second scanning operation. The image signal obtained in the first scanning operation is an image signal that includes the effects of outside light and is outputted from the CIS unit 40 before determining that outside light has penetrated the document-supporting base 2. Therefore, this image signal is stored in the RAM 58 without removing the effects of outside light. Since the effects of outside light have not been removed, it is necessary to repeat the first scanning operation from the scanning position at the point when the controller 55 determined that outside light had penetrated the document-supporting base 2.

After modifying the white reference data used by the shading correction circuit 71 in S13, in S14 the controller 55 returns the scanning position a specified number of lines. In other words, the carriage motor 65 is rotated in reverse so that the carriage 41 is moved a prescribed number of lines in a direction opposite the direction in which the carriage 41 was moved during the scanning operation. The prescribed number of lines is an appropriate number of lines stores in the EEPROM 59 for returning the scanning position toward the partitioning member 51 from the scanning position (scan line) corresponding to the image signal obtained in the second scanning operation when the controller 55 determined that outside light had penetrated the document-supporting base 2. The prescribed number of lines is set based on the data processing speed of the controller 55 and the like and the movement velocity of the carriage 41. After returning the scanning position by moving the carriage 41 in reverse, the controller 55 restarts the carriage 41 in S15. Here, the controller 55 begins rotating the carriage motor 65 in the forward direction so that the carriage 41 resumes movement in the same direction that the carriage 41 moved during the previous scanning operation.

After restarting the carriage 41, in S16 the controller 55 determines whether the scanning position of the CIS unit 40 has reached the outside light detection position. The outside light detection position is the scanning position corresponding to the data for the outside light detection position acquired in S11 and will serve as the position for resuming scanning. The controller 55 makes the determination in S16 by monitoring the number of drive pulses applied to the carriage motor 65. If the controller 55 determines that the scanning position has not yet reached the position to resume scanning (S16: NO), then the CIS unit 40 remains in a standby state while only the carriage 41 continue to move. When the controller 55 determines that the scanning position has reached the resuming position (S16: YES), then the controller 55 returns to S6, thereby restarting the first and second scanning operations from the scanning position of the second scanning operation at which the controller 55 had determined that outside light had penetrated the document-supporting base 2.

While the scanning operation was interrupted, the white reference data 30 used for shading correction with the shading correction circuit 71 was modified. After resuming the scanning operation, the shading correction circuit 71 corrects the acquired image signals based on the new white reference data 30.

In this way, the controller 55 temporarily suspends the first scanning operation with the image-reading unit 21 when the controller 55 determines that outside light has penetrated the document-supporting base 2, and subsequently returns the scanning position a prescribed number of lines before restarting the first scanning operation with the image-reading unit 21. The white reference data 30 acquired in S3 is changed to the new white reference data 30 calculated in S12. After restarting the scanning operation, image signals acquired in the first scanning operations are modified according to the new white reference data 30, thereby enabling the CIS unit 40 to remove the effects of outside light without providing a special circuit or the like to perform a correction for removing the effects of outside light. The effects of outside light are removed from an image signal through shading correction using the modified white reference data 30. In other words, the controller 55 performs a shading correction process on image signals based on the modified white reference data 30 in order to remove the effects of outside light from image signals that the image-reading unit 21 outputs during the first scanning operation after the controller 55 determines that outside light has penetrated the document-supporting base 2. Hence, the correction process in the preferred embodiment modifies the white reference data 30 stored in the RAM 58 based on an image signal outputted from the image-reading unit 21 in the second scanning operation at which time the controller 55 determined that outside light had penetrated the document-supporting base 2.

As described above, the image-reading device 1 according to the preferred embodiment not only performs a first scanning operation, which is a normal scanning operation for outputting a document image as image signals scanned while the light sources 42 are on, but also performs a second scanning operation for outputting image signals of the document image scanned when the light sources 42 are off. In this way, the image-reading device 1 can determine whether outside light has penetrated the document-supporting base 2 based on image signals obtained in the second scanning operation in a process performed simultaneously with the normal scanning operation. Hence, the image-reading device 1 according to the preferred embodiment can accurately detect during a scanning operation when outside light that can affect the scanning process has penetrated the document-supporting base 2, without providing a separate sensor for detecting such outside light.

Figure 11:
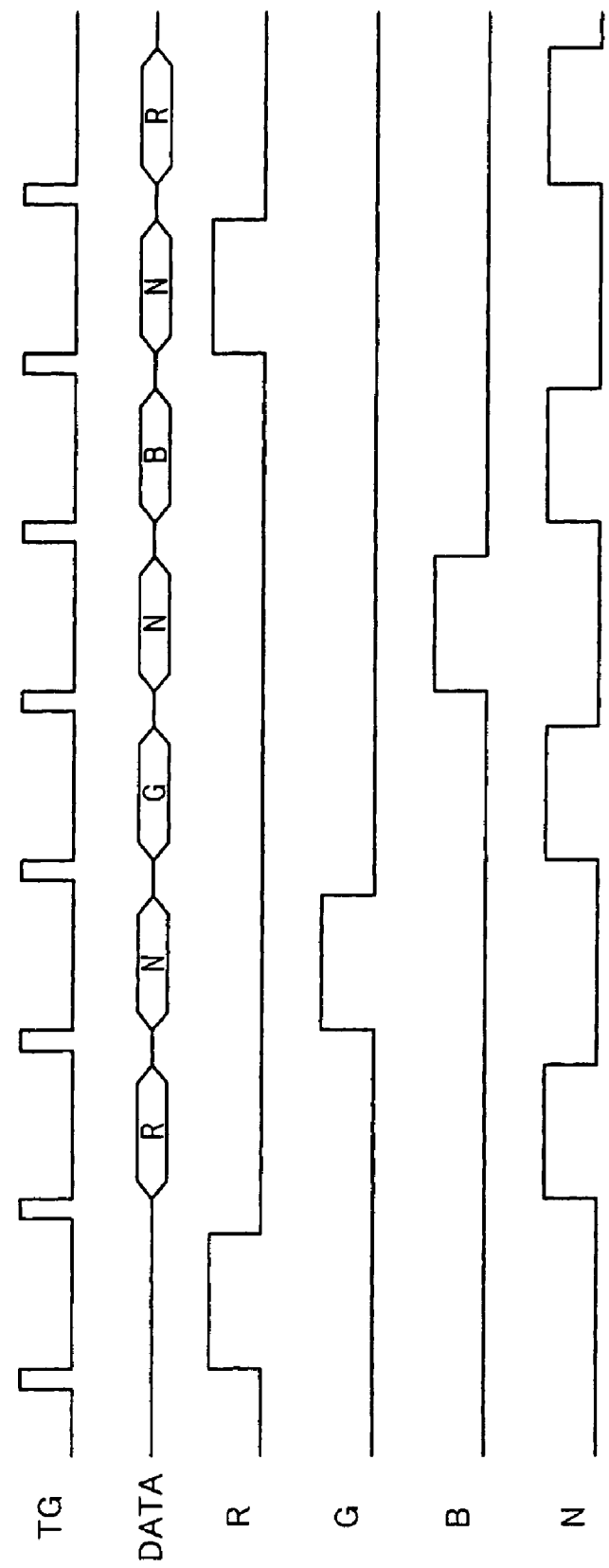
FIG. 11 is a timing chart illustrating a variation of the scanning operation executed by the image-reading unit of the image-reading device.

FIG. 11 is a timing chart illustrating a variation in the scanning operation executed by the image-reading unit 21.

As shown in FIG. 11, it is possible to execute alternately the first scanning operation in which the light sources 42 irradiate light in one of the colors red, green, or blue onto the document for outputting the document image as one line worth of an image signal, and the second scanning operation for outputting the document image scanned with the light sources 42 turned off as one line worth of image signals. In this way, penetrating outside light is detected rapidly.

While the invention has been described in detail with reference to specific embodiments thereof, it would be apparent to those skilled in the art that many modifications and variations may be made therein without departing from the spirit of the invention, the scope of which is defined by the attached claims. For example, in the preferred embodiment described above, the first scanning operation is a color scanning operation for outputting a document image as an image signal for one line while irradiating three colors from the light sources 42 in sequence. However, the first scanning operation may instead be a monochrome scanning operation for outputting the document image as one line worth of image signals while irradiating a single color of light from the light sources 42.

Further, while the controller 55 controls the image-reading unit 21 to alternately execute the first and second scanning operations in the preferred embodiment, the scanning operation executed by the image-reading unit 21 is not limited to this format. The controller 55 may control the image-reading unit 21 to execute the second scanning operation at intervals between executing the first scanning operation a plurality of times. For example, the image-reading unit 21 may be controlled to execute the second scanning operation at intervals between executing the first scanning operation five times (a scanning operation for outputting five lines with of image signals). Hence, the controller 55 may determine whether outside light has penetrated the document-supporting base 2 at a suitable frequency.

Further, the image-reading device 1 in the preferred embodiment determines that outside light has penetrated the document-supporting base 2 when even a portion of the line worth of image signals in the main scanning direction exceeds the outside light detection level, but the preferred embodiment is not limited to this determination. For example, the image-reading device 1 may determine that outside light has penetrated the document-supporting base 2 based on whether the image signal exceeds the outside light detection level for a prescribed number of pixels within the image signals for one line, or based on whether an average value of signal intensity for one line worth of image signals exceeds the outside light detection level.

Further, the correction process in the preferred embodiment is a process for modifying the white reference data 30 used in shading correction, but the correction process is not limited to this process For example, the image-reading device 1 may remove the effects of outside light by subtracting the values of image signals outputted during the second scanning operation from output values of image signals outputted in the first scanning operation.

Further, the process performed when the controller 55 determines that outside light has penetrated the document-supporting base 2 is not limited to a process for modifying the white reference data 30 used in the shading calibration. For example, when penetrating outside light is detected, the image-reading device 1 may display a message on the liquid crystal display of the control panel 8 notifying the user that outside light has penetrated the document-supporting base 2, or may simply cancel the scanning operation. Further, after notifying the user that outside light has penetrated the document-supporting base 2, the user may be prompted to select whether to cancel or resume the scanning operation through operations on the control panel 8.

Further, in the preferred embodiment described above, the controller 55 detects the penetration of outside light based on image signals in the second scanning operation after the circuits 69-73 have processed the signals, but the process is not limited to this timing. For example, the determination process may be performed based on the analog image signals outputted from the CIS unit 40 in the second scanning operation, based on digital image signals outputted from the AFE circuit 69 in the second scanning operation, or based on image signals from the second scanning operation that have undergone shading correction by the shading correction circuit 71 but have not yet been corrected with the γ-correction circuit 72.

Further, while the image-reading unit 21 in the preferred embodiment described above has a CIS unit 40, the image-reading unit 21 is not limited to this construction. For example, the image-reading unit 21 may employ a CCD line sensor or the like, provided that the image-reading unit 21 scans the document image one line at a time while the light source irradiates light onto the document.

While the image-reading unit 21 reads the document image one line at a time in the preferred embodiment, the image-reading unit 21 may be read the document image a plurality of lines at a time. Further, while the light sources 42 employ three-color light-emitting diodes (LEDs) in the preferred embodiment, a white light source may be employed as the light sources 42 and light-receiving elements for each color may be employed.

What is claimed is:

1. An image-reading device comprising:
   a document-supporting base having a transparent member on which a document is placed;
   a document-pressing member disposed on the document-supporting base so as to cover the transparent member, the document-pressing member being capable of opening and closing on the document-supporting base;
   a reading unit having a light source and capable of reading an image from the document placed on the transparent member while the light source irradiates light on the document;
   a controlling unit configured to control the reading unit to execute a first scanning operation to output image signals for the image on the document while the light source is lit, and a second scanning operation to output image signals for the image on the document while the light source is not lit;
   a determining unit configured to determine whether outside light has penetrated the document-supporting base based on the image signals for the second scanning operation outputted from the reading unit;

a correction processing unit configured to perform a correction process to remove effects of outside light on image signals outputted from the reading unit in the first scanning operation after the determining unit determines that outside light has penetrated the document-supporting base; and a shading correction unit configured to perform, based on white reference data, a shading correction on image signals outputted from the reading unit in the first scanning operation, wherein, when the determining unit determined that the outside light has penetrated the document-supporting base, the correction process modifies the white reference data from original white reference data to modified white reference data based on the image signals that have been outputted from the reading unit in the second scanning operation when the light source is not lit, such that some values of the modified white reference data are greater than corresponding values of the original white reference data, and wherein the modified white reference data is used for the shading correction performed on image signals that are output from the reading unit in the first scanning operation after the determination unit determined that the outside light had penetrated the document-supporting base.

2. The image-reading device according to claim 1, wherein the reading unit reads the image from the document one line at a time.

3. The image-reading device according to claim 1, wherein the light source irradiates light, while the reading unit outputs image signals of the image one line at a time for each color in the first scanning operation, wherein the reading unit repeats the first scanning operation to read the images for the entire document, and wherein the controlling unit controls the reading unit to execute the second scanning operation at prescribed intervals between the repeated first scanning operations.

4. The image-reading device according to claim 3, wherein the light source is capable of irradiating light of a plurality of colors, wherein the light source irradiates light of the plurality of colors sequentially, while the reading unit outputs image signals of the image one line at a time for each color in the first scanning operation.

5. The image-reading device according to claim 3, wherein the controlling unit controls the reading unit to alternately execute the first scanning operation and the second scanning operation.

6. The image-reading device according to claim 3, wherein the controlling unit controls the reading unit to execute the first scanning operation a plurality of times and to execute the second scanning operation every plurality of times the first scanning operation is executed.

7. The image-reading device according to claim 1, wherein the light source is capable of irradiating light of a plurality of colors, wherein the light source irradiates light of one of the plurality of colors, while the reading unit outputs image signals of the image one line at a time in the first scanning operation, wherein the reading unit repeats the first scanning operation to read the images for the entire document, wherein the control unit controls the reading unit to execute the second scanning operation at prescribed intervals between the repeated first scanning operations.

8. The image-reading device according to claim 1, wherein the light source is capable of irradiating single light, wherein the light source irradiates the single light, while the reading unit outputs image signals of the image one line at a time in the first scanning operation, wherein the reading unit repeats the first scanning operation to read the images for the entire document, wherein the controlling unit controls the reading unit to execute the second scanning operation at prescribed intervals between the repeated first scanning operations.

9. The image-reading device according to claim 1, wherein the determining unit determines that outside light has penetrated the document-supporting base based on whether the intensity of image signals outputted from the reading unit in the second scanning operation exceeds a prescribed signal level.

10. The image-reading device according to claim 1, wherein the controlling unit comprises a temporarily interrupting portion configured to temporarily interrupt the first scanning operation performed by the reading unit when the determining unit determined that outside light had penetrated the document-supporting base; and a restarting portion configured to restart the first scanning operation with the reading unit after returning a scanning position on the document a prescribed number of lines.

11. An image-reading method for an image-reading device including a document-supporting base having a transparent member on which a document is placed; a document-pressing member disposed on the document-supporting base so as to cover the transparent member, the document-pressing member being capable of opening and closing on the document-supporting base; and a reading unit having a light source, the image-reading method comprising:

reading an image from the document placed on the transparent member one line at a time while the light source irradiates light on the document;

controlling the reading unit to execute a first scanning operation to output image signals for the image on the document while the light source is lit, and a second scanning operation to output image signals for the image on the document while the light source is not lit;

determining whether outside light has penetrated the document-supporting base based on the image signals for the second scanning operation outputted from the reading unit;

performing a correction process to remove effects of outside light on image signals outputted from the reading unit in the first scanning operation after it is determined that outside light has penetrated the document-supporting base in the determining step; and performing, based on white reference data, a shading correction on image signals outputted from the reading unit in the first scanning operation after it is determined that outside light has penetrated the document-supporting base in the determining step, wherein, when it is determined that the outside light had penetrated the document-supporting base, the correction process modifies the white reference data from original white reference data to modified white reference data based on the image signals that have been outputted from the reading unit in the second scanning operation when the light source is not lit, such that some values of the modified white reference data are greater than corresponding values of the original white reference data, and wherein the modified white reference data is used for the shading correction performed on image signals that are output from the reading unit in the first scanning operation after it is determined that outside light has penetrated the document-supporting base in the determining step.

12. The image-reading method according to claim 11, wherein the image from the document is read one line at a time in the reading step.

13. The image-reading method according to claim 11, further comprising correcting effects of outside light on image signals outputted from the reading unit in the first scanning operation after it is determined that outside light has penetrated the document-supporting base in the determining step.

* * * * *